United States Patent [19]

Goldstein et al.

[11] Patent Number: 4,815,799

[45] Date of Patent: Mar. 28, 1989

[54] INFRARED CRYSTALLINE SPATIAL LIGHT MODULATOR

[76] Inventors: Dennis H. Goldstein, 2410 Edgewater Ave., Niceville, Fla. 32578; Martin F. Wehling, Box 1473, Eglin AFB, Fla. 32542

[21] Appl. No.: 137,308

[22] Filed: Dec. 23, 1987

[51] Int. Cl.$^4$ .............................................. G02F 1/03
[52] U.S. Cl. ..................... 350/1.1; 350/356; 350/386; 350/403
[58] Field of Search ............... 350/1.1, 374, 384, 386, 350/400, 403, 356

[56] References Cited

U.S. PATENT DOCUMENTS

| | | | |
|---|---|---|---|
| 2,866,901 | 12/1958 | Stallard et al. | 250/43.5 |
| 3,227,882 | 1/1966 | Bissett et al. | 250/199 |
| 3,517,206 | 6/1970 | Oliver | 250/225 |
| 3,823,998 | 7/1974 | Yazaki et al. | 350/150 |
| 4,068,190 | 1/1978 | Ferguson | 331/94.5 |
| 4,129,781 | 12/1978 | Doyle | 250/341 |
| 4,243,881 | 1/1981 | Bethume et al. | 250/338 |
| 4,618,217 | 10/1986 | Armitage | 350/355 |
| 4,619,501 | 10/1986 | Armitage | 350/386 |
| 4,643,533 | 2/1987 | Armitage | 350/350 S |

OTHER PUBLICATIONS

"A Fast Silicon Photoconductor–Based Liquid Crystal Light Valve", P. O. Braatz, K. Chow, U. Efron, J. Grinberg and M. J. Little, IEEE International Electron Devices Meeting, pp. 540–543, 1979.

"LiNbO$_3$ and LiTaO$_3$ Microchannel Spatial Light Modulators", C. Warde, A. M. Weiss and A. D. Fisher, SPIE, vol. 218, pp. 59–66, Devices and Systems for Optical Signal Processing, 1980.

"Oblique-Cut LiNbO$_3$ Microchannel Spatial Light Modulator", C. Warde and J. I. Thakara, Optics Letters, vol. 7, No. 7, Jul. 1982, pp. 344–346.

"Applications of the Priz Light Modulator", D. Casasent, F. Caimi, M. P. Petrov and A. V. Khomenko, Applied Optics, vol. 21, No. 21, 1 Nov. 1982, pp. 3846–3864.

"Optical Information Processing Characteristics of the Microchannel Spatial Light Modulator", C. Warde, A. M. Weiss, A. D. Fisher and J. I. Thakara, Applied Optics, vol. 20, No. 12, 15 Jun. 1981, pp. 2066–2074.

*Primary Examiner*—Bruce Y. Arnold
*Attorney, Agent, or Firm*—Richard J. Donahue; Donald J. Singer

[57] ABSTRACT

A spatial light modulator system having an electro-optic crystal responsive to infrared radiation. An electric field is established across opposed faces of the crystal, and the field is modulated on a point by point basis over one crystal face using a suitable charge distribution write source. Infrared radiation traversing the crystal is modified in polarization in accordance with the pattern imposed on the crystal to simulate an infrared target for testing infrared seekers.

2 Claims, 1 Drawing Sheet

INFRARED CRYSTALLINE SPATIAL LIGHT MODULATOR

STATEMENT OF GOVERNMENT INTEREST

The invention described herein may be manufactured and used by or for the Government for governmental purposes without the payment of any royalty thereon.

BACKGROUND OF THE INVENTION

The present invention related generally to the field of optical signal processing apparatus, and more specifically to an infrared crystalline spatial light modulator.

Two-dimensional spatial light modulators are devices which allow control of an optical wavefront for processing or imaging Operations. These devices, often referred to as light valves in the literature, have potential for application in large screen display systems as well as in optical data processing systems, including missile guidance and robotic vision systems. Listed below are several articles and patents which describe the construction and operation of various embodiments of such spatial light modulators.

1. "A Fast Silicon Photoconductor-Based Liquid Crystal Light Valve", P. O. Braatz, K. Chow, U. Efron, J. Grinberg and M. J. Little, IEEE International Electron Devices Meeting, pp 540–543, 1979.
2. "LiNbO3 and LiTaO3 Microchannel Spatial Light Modulttors", C. Warde, A. M. Weiss and A.D. Fisher, SPIE Vol 218, Devices and Systems for Optical Signal Processing, 1980.
3. "Applications of Priz Light Modulator", D. Casasent, F. Caimi, M. Petron and A. Khomenko, Applied Optics, Vol. 21., No. 21, November 1982, pp. 3846–3854.
4. U.S. Pat. No. 3,517,206 entitled "APPARATUS AND METHOD FOR OPTICAL READ-OUT OF INTERNAL ELECTRIC FIELD", and incorporated herein by reference.
5. U.S. Pat No. 3,823,998 entitled "LIGHT VALVE", and incorporated herein by reference.
6. U.S. Pat. No. 4,618,217 entitled "ELECTRON BOMBARDED SILICON SPATIAL LIGHT MODULATOR", and incorporated herein by reference.
7. U.S. Pat. No. 4,619,501 entitled "CHARGE ISOLATION IN A SPATIAL LIGHT MODULATOR", and incorporated herein by reference.

In certain spatial light modulators, spatially modulated data to be processed is imaged onto the face of an electro-optic crystal having a field-forming voltage thereacross. A spatially modulated charge distribution is formed across the face of the crystal, and when the opposed face of the crystal is illuminated with a uniform read light beam, the light emerging from the device is polarization modulated spatially with an amplitude of modulation that varies in accordance With the Original input data pattern. The charge distribution pattern may be formed on the face of the crystal by various means, as for example, by writing the pattern onto the crystal face with an electron source, or by the action of a laser beam on a suitable photoconductive layer deposited on the crystal face.

A spatial light modulator, for example, may specifically comprise a photosensitive semiconductor layer, such as a silicon photoconductor or photodiode layer, a light blocking layer, a dielectric mirror and an electro-optic crystal with a transparent electrode on its exposed face, arranged in a sandwich-like composite structure, and having a field-forming voltage applied thereacross. A control (write) illumination impinges on the face of the photoconductor while an output (read) illumination makes a double pass through the electro-optic crystal.

The silicon photoconductor responds to intensity variations in the control illumination impinging thereon. In the dark, most of the voltage applied across the composite structure appears across the photoconductor. The write beam, however, excites carriers in the silicon, which are driven by the internal field to the Si/electro-Optic crystal interface. The voltage across the silicon decreases, while the voltage across the electro-optic crystal increases. The read illumination passes through the electro-optic crystal, is reflected off of the dielectric mirror, and again passes through the electro-optic crystal before emerging from the device. Since the diffraction efficiency : a function of the voltage applied thereacross (which is a function of the intensity of the write illumination), optical control of the output read illumination is achieved.

In addition to the potential applications for spatial light modulators mentioned earlier herein, other applications exist for spatial light modulators which can modulate infrared radiation. For example, they may be useful as a processing component in an infrared optical systolic array processor, or as a display device to project infrared scenes, as in an infrared target simulator for testing infrared seekers.

OBJECTS AND SUMMARY OF THE INVENTION

It is therefore the primary object of the present invention to provide electro-optic apparatus for modulating infrared radiation.

It is a more specific object of the present invention to provide a spatial light modulator for projecting infrared scenes.

In accordance with the present invention a crystal which exhibits the Pockels (birefringence) effect and is transparent to infrared radiation has an electric field established thereacross. The field is modulate d On a point by point basis over one crystal face using a suitable charge producing source, such as an electron beam gun, or by the action of a laser beam on a photoconductive layer on the crystal. Polarized infrared radiation traversing the crystal is modified in polarization in accordance with the charge pattern imposed on the face of the crystal.

BRIEF DESCRIPTION OF THE DRAWINGS

This invention together with its objects, features and advantages may be better understood from the following detailed description when read in conjunction with the drawing, in which.

DETAILED DESCRIPTION OF THE INVENTION

Figure 1:
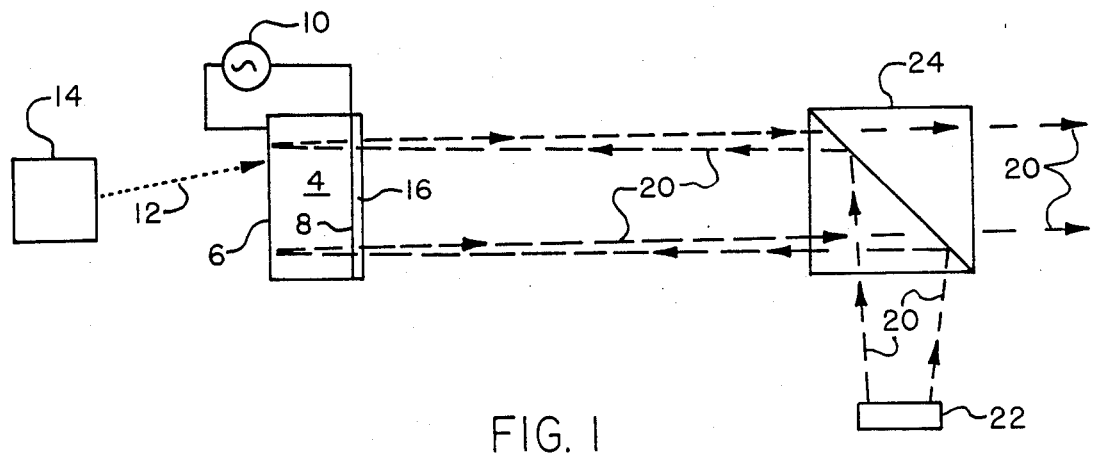
FIG. 1 is a diagram of an infrared crystalline spatial light modulator constructed in accordance with a preferred embodiment of the invention.

Referring now to the drawings, FIG. 1 is a diagrammatic illustration of the major components of the present invention. An electro-optic crystal 4 which exhibits the Pockels effect has an electric field established across the faces 6 and 8 thereof by an alternating current source 10. Transparent layer electrodes, such as disclosed in the patents listed earlier herein, may be used to couple current source 10 across crystal faces 6 and/or 8. The electric field is modulated on a point by point basis over crystal face 6 using a suitable scanning charge-forming source, such an electron beam 12 from an electron beam gun 14. An antireflection coating 16 may be applied to face 8 of crystal 4 to reduce Fresnel losses.

A narrow band infrared beam 20 radiating from an infrared source 22 travels through polarizing beamsplitter 24 and is deflected thereby through crystal 4 where it is reflected at the far face 6 and emerges from crystal 4 with the electron charge/crystal birefringence pattern spatially encoded as a polarization pattern across the spatial extent thereof. Beam 20 again passes through polarizing beamsplitter 24 where the undesired polarization component is automatically suppressed and the desired component of the polarization field is transmitted. Thus, the original spatial charge distribution is now converted to an infrared spatial intensity distribution.

The basic physical phenomenon utilized in this modulation system is the electrically-induced birefringence of certain crystalline substances in the infrared region of the electromagnetic spectrum. The crystal 4 being used herein must exhibit two properties: it must be transparent in the spectral region of interest, and it must exhibit electrically-induced birefringence. For example, lithium niobate ($LiNBO_3$) and lithium tantalate ($LiTaO_3$) materials transmit from 0.45 micrometers to 4.5 micrometers and exhibit the requisite refractive indices for use herein.

Figure 2:
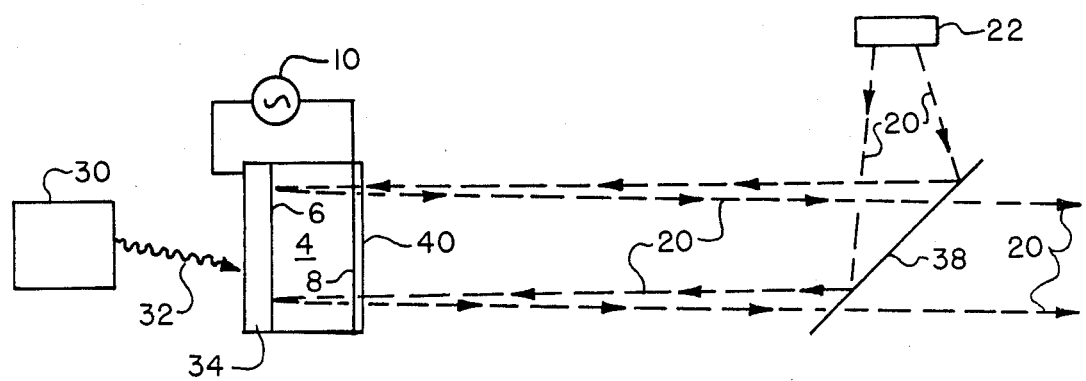
FIG. 2 is a diagram of an alternative embodiment of the present invention.

FIG. 2 illustrates an alternative embodiment of the present invention in which a different method is used for writing the distribution of information onto the electro-optic crystal 4. Here, a laser 30 is used to apply a laser beam 32 onto a photoconductive semiconductor layer 34 deposited on face 6 of crystal 4. The resulting charge distribution modulates the spatial distribution of birefringence in crystal 4. In this embodiment, infrared energy beam 20 from infrared source 22 is directed to and from electro-optic crystal 4 via a beamsplitter 38, and narrowband infrared radiation is polarized by a polarizer 40 on face 8 of crystal 4.

In both embodiments of the invention, the crystal is subjected to an alternating current from source 10 which is of suitable magnitude and frequency to remove the accumulated charge distribution from the face 6 of crystal 4, so that the charge distribution pattern can be periodically updated.

While the invention has been described with reference to particular embodiments thereof, it will be understood by those skilled in the art that the invention is capable of a variety of alternative embodiments that come within the spirit and scope of the appended claims.

What is claimed is:

1. An infrared target simulator system comprising:
   an electro-optic crystal exhibiting electrically-induced birefringence and being transparent to infrared radiation, said crystal having a first face and an opposed second face,
   an antireflection coating on said second face of said crystal for reducing Fresnel losses,
   an alternating current source forming an electric field between said first face and said second face of said crystal,
   a scanning electron beam source forming a spatial charge distribution on said first face of said crystal indicative of the infrared signature of a target,
   a source of infrared radiation,
   and a polarizing beamsplitter directing infrared radiation from said source into said second face of said crystal and receiving a modulated infrared radiation beam emerging from said second face of said crystal, said beamsplitter providing an output beam having the infrared spatial intensity distribution signature of a simulated target.

2. A method of simulating the infrared signature of a target comprising the steps of:
   a. scanning a first face of an electro-optic crystal exhibiting electrically-induced birefringence and being transparent to infrared radiation with a scanning beam, to provide a charge distribution pattern on said first face related to the infrared signature of said target,
   b. directing a beam of infrared radiation from an infrared source through a polarizer and into an opposed second face of said crystal, and
   c. passing the beam of modulate d infrared radiation emerging from said second face of said crystal through said polarizer, Whereby an undesired polarization component of said modulated infrared radiation beam is suppressed and the desired polarization component of said modulated beam derived from said polarizer represents the infrared spatial intensity distribution of said target.

* * * * *